Aug. 21, 1928.

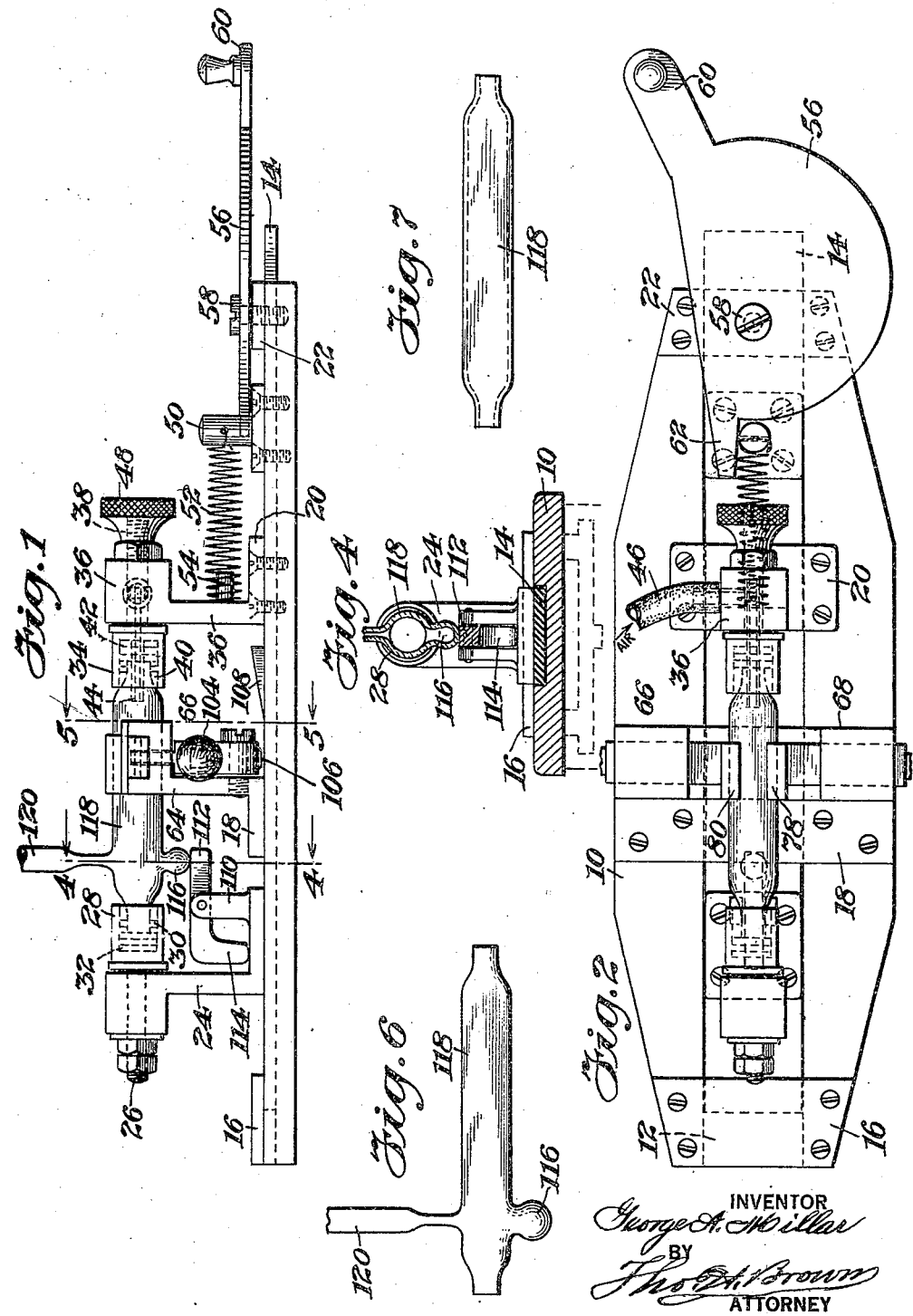

G. A. MILLAR 1,681,591

GLASS WORKING MACHINE

Filed March 1, 1927    2 Sheets-Sheet 2

INVENTOR
George A. Millar
BY
Thos. A. Brown
ATTORNEY

Patented Aug. 21, 1928.

1,681,591

UNITED STATES PATENT OFFICE.

GEORGE A. MILLAR, OF RIDGEFIELD PARK, NEW JERSEY, ASSIGNOR TO COOPER HEWITT ELECTRIC COMPANY, OF HOBOKEN, NEW JERSEY, A CORPORATION OF NEW JERSEY.

GLASS-WORKING MACHINE.

Application filed March 1, 1927. Serial No. 171,745.

The present invention relates to machinery for working hollow glass bodies, and the invention particularly relates to means for holding a hollow glass blank in a glass working machine.

Various objects and advantages of the invention will be obvious from the following particular description of one form of mechanism embodying the invention or from an inspection of the accompanying drawings; and the invention also consists in certain new and useful features of construction and combinations of parts hereinafter set forth and claimed.

Figure 3:
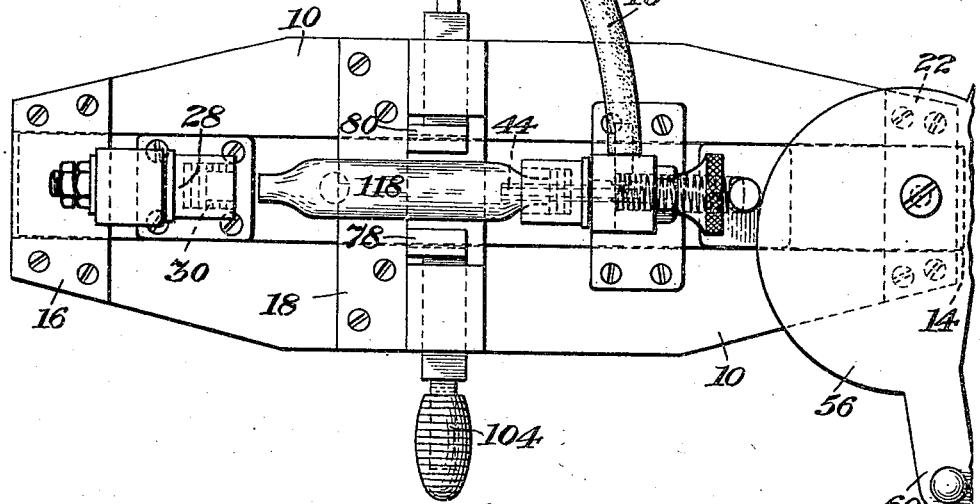
Figure 5:
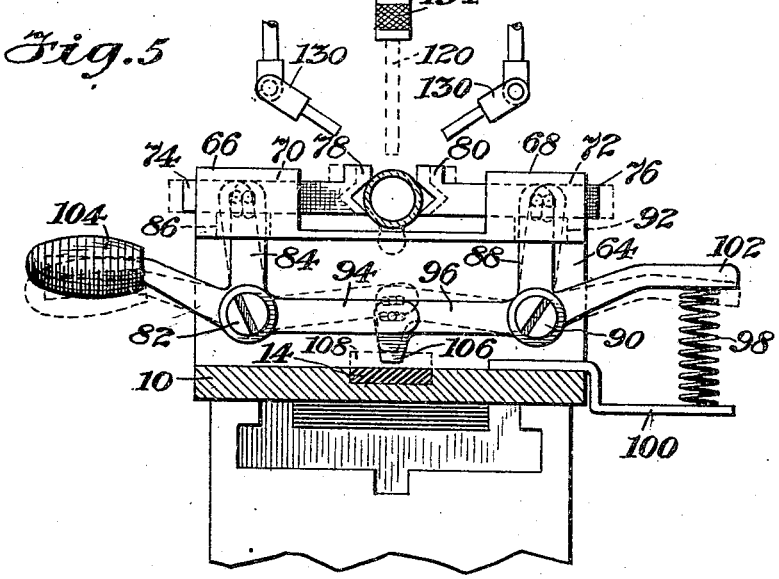

In the accompanying drawings there is shown for purposes of illustration one form of mechanism embodying the invention, in which Fig. 1 is a front elevation view of the clamping mechanism of the invention, Fig. 2 is a plan view thereof in the closed position, Fig. 3 is a plan view thereof in an open position, Fig. 4 is a vertical sectional view taken along the line 4—4 of Fig. 1 looking in the direction of the arrows, Fig. 5 is a vertical section view taken along the line 5—5 of Fig. 1 looking in the direction of the arrows, Fig. 6 is a longitudinal elevation view of a piece of glass work formed from a blank which is shown in Fig. 7 while being held in the mechanism herein described or illustrating the invention.

In the drawings the support plate 10 has formed throughout the length thereof the rectangular groove or channel 12 in which is mounted for longitudinal movement therein the slide member 14, the straps 16, 18, 20 and 22 serving to hold said slide 14 in channel 12 and some of them to carry parts which cooperate with parts mounted to said slide 14. Between said straps 16 and 18 said slide 14 near one end thereof supports the upwardly extending post 24 mounted thereto. Said post 24, by means of the bolt 26 which is free to rotate therein, supports the chuck member 28 which is aligned on the line of movement of said slide 14 and has a bore 30 therein facing the opposite end of slide 14 in the bottom of which is provided a compressible body 32 which is of asbestos or other material suitable for closing the end of a glass tube pressed thereagainst. Facing said chuck member 28 is the chuck member 34 which is of similar design and is mounted for rotation to a post 36 by means of a bolt 38, said post 36 being mounted to said slide 14. In the bottom of the depression 40 in member 34 is mounted the packing body 42 which is annular in shape and through which extends the tube 44 which at one end projects beyond said chuck member 34 and at its other end is mounted to said bolt 38. The central opening of said tube 44 connects through an opening in said bolt 38 which extends through one side thereof and to an annular opening formed in the inner surface of the bore through which said bolt 38 extends in post 36, and a pipe or hose 46 connects at one end to a source of air pressure not shown and at its other end to said post 36 and the said annular channel formed therein. A handle knob 48 of said bolt 38 serves to rotate said chuck member 42 to rotate work held thereby and by said chuck 28 as hereinafter described. Mounted to said slide 14 between said straps 20 and 22 is post 50 and a compression spring 52 having one end to said post 50 and its other end positioned about the pin 54 on said post 36 tends to move said slide 14 to bring said chuck 28 towards said chuck 34. A cam 56 mounted to said strap 22 by the screw 58 serves for moving said chuck 28 away from chuck 34 against the compression of said spring 52, a handle 60 being provided for this purpose, said handle 60 serving as a dead center stop member at an extreme position of chuck 28 from chuck 34. A stop member 62 is provided on said cam 56 at a point which permits an extreme position of chuck 28 toward said chuck 34.

Said strap 18 has an upright extension 64 which extends across said plate 10 and upwardly to a position above a line connecting the centers of said chucks 28 and 34. At its upper end said extension 64 is cut away transversely at its center and carries one on each side the transverse enlargements 66 and 68 which have formed therethrough respectively the slideways 70 and 72 which are lined with each other and extend transversely of the axis of said chucks 28 and 34. Slidable in said ways 70 and 72 are the slides 74 and 76 respectively which carry at their inner ends the cooperating V block clamps 78 and 80 respectively. Pivoted to extension 64 by the screw 82 and beneath said enlargement 66 is a crank member which has one arm 84 which extends through an opening 86 from the bottom of said enlargement 66 and to the slideway 70 and pivotally connected with said slide 74. A similar crank arm 88 pivoted by screw 90 below said enlargement 68 extends through the opening 92 and pivotally connects with said slide member 76. Said crank arms 84 and 88 have fixed thereto respectively the arms 94 and 96 which extend toward each other and have therebetween a slot and pin connection to provide for the simultaneous movement of said clamp blocks 78 and 80. A compression spring 98 mounted between a bracket 100 fixed to said plate 10 and an arm 102 fixed to said crank, the arms 88 and 96 tending to move said clamp blocks 78 and 80 toward each other and a handle arm 104 fixed to arms 84 and 94 serves for moving said clamp blocks 78 and 80 to open them against the compression of said spring 98. Means are also provided for automatically opening said clamp blocks 78 and 80 upon the movement of said cam 56 to move said chuck 28 away from said chuck 34. These means comprise a downward extension 106 from said arm 96 and a wedge cam 108 mounted to said slide 14 between said straps 18 and 20. Movement of said cam 56 to move chuck 38 away from chuck 34 moves said cam 108 against said extension 106 which latter thereby is raised against the tension of spring 98 and said blocks 78 and 80 are moved apart.

Below said chuck 28 is provided a gauge means comprising a post 110 mounted to said slide 14 which carries a pivoted lever 112 one end of which carries a downwardly extending projection 114 which rests on said slide 14 and serves to position the opposite end of lever 112 which opposite end serves as a measuring indicator for the length of bulbs such as the bulb 116 formed on the tubular envelope 118 clamped between said chucks 28 and 34.

The use and operation of the holding means above described for holding the hollow glassware during the working thereof can be illustrated by describing its use for holding a tubular glass body 118 (see Fig. 7) having constricted ends during operations of forming a bulb extension 116 on the side wall thereof and a tubulation 120 on the opposite side thereof as illustrated in Fig. 6. The blank illustrated in Fig. 6 is used as an envelope for mercury switch which will have electrodes sealed into each end thereof one of which will extend into said bulb 116 and will have a body of mercury provided therein and will have the atmosphere thereof evacuated after which said tubulation 120 will be sealed off to close the envelope. The clamping devices above illustrated for making the part shown in Fig. 6 from the blank shown in Fig. 7 is used in connection with a working machine such as is illustrated diagrammatically in Fig. 5. First, the cam 56 is moved against the compression of said spring 52 to move said chuck 28 away from said chuck 34 and to cause said blocks 78 and 80 to move apart. A blank 118 is then inserted between blocks 78 and 80 one end being slipped over the end of tube 44 and against said packing material 42. Said cam 56 is then moved to permit spring 52 to move chuck 28 toward chuck 34 and bring the packing material 32 thereof against the opposite end of said blank 118. At the same time said cam 108 will be moved away from said member 106 thereby permitting said spring 98 to close said blocks 78 and 80 against said body 118, said cam 108 in the preferred form of the invention becoming effective to permit the action of said spring 98 to close said blocks 78 and 80 before said packing material 32 presses against the end of the block 118 whereby the blank 118 is properly centered before said packing material 32 closes the end of the blank. Through the fires 130 in the machine of Fig. 5 the blank 118 is fused at a spot near one end thereof and air pressure is applied through said hose 46 to blow a bulb 116 thereat, sufficient additional glass being supplied by melting a piece of cane against the fused spot and the glass being allowed to cool and be heated in several parts during application and control of air pressure in the envelope 118 to blow said bulb 116 with the constriction at its jointure with said blank 118 in a manner well known in the art of working glass. The approach of said bulb 116 to a proper length is measured from time to time by rotating blank 118 by means of said handle 48 to bring said bulb 116 over said lever 112 which serves to indicate the proper length after the bulb 116 has been formed said handle 48 is rotated to bring said bulb below the envelope in the position indicated in Fig. 1 for the purpose of forming a tubulation 120 onto said envelope 118 at a point diametrically opposite said bulb 116. The glass tube is mounted in the chuck 134 which also serves to close the upper end of said tube 120 and the fires 136 are brought to fuse the glass of the envelope at the point to which the tube is to be joined and the glass thereat blown out by increasing the pressure applied from said tube 46. The lower end of tube 120 is then brought down close to the blown out point on the envelope 118 and the glass of both parts melted and joined together in a manner well known in the art. After the glass is hardened at the tubulation the chuck 134 is opened to release tube 120 and cam 56.

While I have shown and described and have pointed out in the annexed claims certain novel features of the invention, it will be understood that various omissions, substitutions and changes in the forms and details of the device illustrated and in its use and operation may be made by those skilled in the art without departing from the spirit of the invention.

I claim—

1. In combination, in a glass working machine, means for holding a tubular blank comprising a set of side clamps and a set of end clamps, said end clamps being adapted to close the ends of said blank, one of said end clamps having an opening therethrough connecting at one end with the interior of said blank and at the other with means for connection to a source of air pressure.

2. In combination, in a glass working machine, means for holding a tubular blank comprising a set of side clamps and a set of end clamps, one of said end clamps being movable away from the other, and means connected to said movable end clamp for moving the said side clamps to open them.

3. In combination, in a glass working machine means for holding a tubular blank comprising a set of side clamps and a set of end clamps, means tending to close said side clamps, one of said end clamps being movable away from the other end clamp, and means mounted to said movable end clamp and movable therewith effective when said movable end clamp is moved away from the other end clamp to operate said side clamps to open them against the tendency of said closing means.

4. In combination, in a glass working machine, a pair of chucks oppositely mounted and movable toward and from each other, each having a resilient means for closing the end of a glass tube blank and both of them mounted for rotation about a common axis and one of them having a passage therethrough for connecting a hollow blank held thereby to a source of air pressure, means tending to move one of said chucks toward the other, means for moving said movable chuck against said tendency to separate said chucks, a set of clamps for laterally gripping a blank held by said chucks, means tending to hold said clamps closed, and means movable by said chuck moving means for opening said clamps.

5. In combination, in a glass working machine, a pair of chucks oppositely mounted and movable toward and from each other, each having resilient means for closing the end of a glass tube blank and both of them mounted for rotation about a common axis and one of them having a passage therethrough for connecting a hollow blank held thereby to a source of air pressure, means tending to move one of said chucks toward the other, means for moving said movable chuck against said tendency to separate said chucks, a set of clamps for laterally gripping a blank held by said chucks, means tending to hold said clamps closed, and means movable by said chuck moving means for opening said clamps, and manual means for directly opening said clamps.

6. In combination, in a glass working machine, a pair of chucks oppositely mounted and movable toward and from each other each having resilient means for closing the end of a glass tube blank and both of them mounted for rotation about a common axis and one of them having a passage therethrough for connecting a hollow blank held thereby to a source of air pressure, means tending to move one of said chucks toward the other, means for moving said movable chuck against said tendency to separate said chucks, a set of clamps for laterally gripping a blank held by said chucks, means tending to hold said clamps closed, and means movable by said chuck moving means for opening said clamps, said clamp opening means being movable by said means which tends to move said movable chuck towards the other said chuck to permit the closing of said clamps by said clamp closing means.

7. In combination, in a glass working machine, a pair of chucks oppositely mounted and movable toward and from each other each having resilient means for closing the end of a glass tube blank and both of them mounted for rotation about a common axis and one of them having a passage therethrough for connecting a hollow blank held thereby to a source of air pressure, means tending to move one of said chucks toward the other, means for moving said movable chuck against said tendency to separate said chucks, a set of clamps for laterally gripping a blank held by said chucks, means tending to hold said clamps closed, and means movable by said chuck moving means for opening said clamps, said clamp opening means being movable by said means which tends to move said movable chuck towards the other said chuck to permit the closing of said clamps by said clamp closing means, and effective to permit said clamp closing means to move said clamps to a completely closed position before said movable chuck is moved against a blank held by other said chuck whereby said clamps can serve as means for centering the tubular blank which is to be closed by said chucks before said chucks are closed against said blank.

8. In combination in a glass working machine, a pair of chucks oppositely mounted and movable toward and from each other each having resilient means for closing the end of a glass tube blank and both of them mounted for rotation about a common axis and one of them having a passage therethrough for connecting a hollow blank held thereby to a source of air pressure, means tending to move one of said chucks toward the other, means for moving said movable chuck against said tendency to separate said chucks, a set of clamps for laterally gripping a blank held by said chucks, means tending to hold said clamps closed, and means movable by said chuck moving means for opening said clamps, and a gauge positioned laterally from a blank held between said chucks and adapted for measuring a projection carried by such blank.

9. In combination in a chuck for holding tubular glass blanks in a glass working machine, a bed plate, a slide mounted for movement longitudinally on said plate, a horizontal chuck carried by said plate near one end thereof adapted for rotation about a horizontal axis, a second chuck mounted to said plate and facing first said chuck on a common axis, second said chuck also being rotatable about said axis, both said chucks having lateral parts for surrounding the end of a tubular blank and having end walls for closing the respective ends of a blank held therebetween and one of said chucks having means for connecting the interior of a blank to a source of air pressure, a spring tending to move said slide to carry the chuck mounted thereto toward the other said chuck, a cam for moving said slide against the action of said spring to move the chuck mounted to said slide away from the other said chuck, a pair of clamps facing each other across the axis of said chucks, a link connection between said clamps, a second spring tending to close said clamps, a cam engaging member carried by the link connection between said clamps, and a cam carried by said slideway for engaging said cam engaging member to cause it to move to open said clamps in opposition to the tendency of said second spring when said slideway is moved to move the chuck carried thereby away from the other said chuck.

10. In combination in a chuck for holding tubular glass blanks in a glass working machine, a bed plate, a slide mounted for movement longitudinally on said plate, a horizontal chuck carried by said plate near one end thereof adapted for rotation about a horizontal axis, a second chuck mounted to said plate and facing first said chuck on a common axis, second said chuck also being rotatable about said axis, both said chucks having lateral parts for surrounding the end of a tubular blank and having end walls for closing the respective ends of a blank held therebetween and one of said chucks having means for connecting the interior of a blank to a source of air pressure, a spring tending to move said slide to carry the chuck mounted thereto toward the other said chuck, a cam for moving said slide against the action of said spring to move the chuck mounted to said slideway from the other said chuck, a pair of clamps facing each other across the axis of chucks, a link connection between said clamps, a second spring tending to close said clamps, a cam engaging member carried by the link connection between said clamps, and a cam carried by said slideway for engaging said cam engaging member to cause it to move to open said clamps in opposition to the tendency of said second spring when said slideway is moved to move the chuck carried thereby away from the other said chuck and said cam being adapted to release said clamps to permit them to be closed by said second spring before the chuck carried by said slide engages a glass tube blank positioned between said chucks and said clamps whereby said clamps will serve as centering means for the blank before the said chucks are closed thereagainst.

11. In combination, in a glass working machine, a pair of chucks oppositely mounted and movable toward and from each other, each having resilient means for closing the end of a glass tube blank and both of them mounted for rotation about a common axis and one of them having a passage therethrough for connecting a hollow blank held thereby to a source of air pressure, means tending to move one of said chucks toward the other, means for moving said movable chuck against said tendency to separate said chucks.

12. In combination, in a glass working machine, a pair of chucks oppositely mounted and movable toward and from each other each having resilient means for closing the end of a glass tube blank and both of them mounted for rotation about a common axis and one of them having a passage therethrough for connecting a hollow blank held thereby to a source of air pressure, means tending to move one of said chucks toward the other, means for moving said movable chuck against said tendency to separate said chucks.

Signed at Hoboken, in the county of Hudson and State of New Jersey, this 24th day of February A. D. 1927.

GEORGE A. MILLAR.